United States Patent [19]
Nakamura et al.

[11] Patent Number: 5,851,690
[45] Date of Patent: Dec. 22, 1998

[54] HYDROGEN ABSORBING ALLOYS

[75] Inventors: Yumiko Nakamura, Moriguchi; Hiroshi Nakamura, Neyagawa; Maki Kamikawa, Hirakata; Hiroshi Watanabe, Hirakata; Shin Fujitani, Hirakata; Ikuo Yonezu, Hirakata, all of Japan

[73] Assignee: Sanyo Electric Co., Ltd., Osaka, Japan

[21] Appl. No.: 916,446

[22] Filed: Aug. 22, 1997

Related U.S. Application Data

[63] Continuation of Ser. No. 539,221, Oct. 4, 1995, abandoned.

[30] Foreign Application Priority Data

Oct. 5, 1994 [JP] Japan ................................ 6-241026

[51] Int. Cl.$^6$ ........................................................ H01M 4/38
[52] U.S. Cl. .......................... 429/59; 420/434; 420/581; 420/582; 420/583; 420/584; 420/585; 420/587; 420/588; 420/900
[58] Field of Search ............................ 424/59, 101, 218; 429/29, 30, 33; 420/900, 554, 434, 581, 582, 583, 584, 586, 587, 588, 553; 148/424

[56] References Cited

U.S. PATENT DOCUMENTS

| | | | |
|---|---|---|---|
| 4,370,163 | 1/1983 | Moriwaki et al. | 423/644 |
| 4,457,891 | 7/1984 | Bernauer et al. | 420/900 |
| 4,946,646 | 8/1990 | Gamo et al. | 420/415 |

FOREIGN PATENT DOCUMENTS

| | | |
|---|---|---|
| 333632 | 9/1989 | European Pat. Off. . |
| 54-68702 | 6/1979 | Japan ................... 420/900 |
| 58-99102 | 6/1983 | Japan . |
| 58-204148 | 11/1983 | Japan . |
| 62-90850 | 4/1987 | Japan . |
| 2-65060 | 3/1990 | Japan . |
| 2-78868 | 3/1990 | Japan . |

*Primary Examiner*—Stephen Kalafut
*Attorney, Agent, or Firm*—Armstrong, Westerman, Hattori, McLeland & Naughton

[57] ABSTRACT

A hydrogen absorbing alloy for use in an environment where the alloy has the possibility of contacting oxygen is capable of inhibiting impairment of the hydrogen absorbing ability thereof when coming into contact with oxygen. The alloy has a composition represented in atomic ratio by $Ti_{1-x}Y_xMn_y$, wherein x and y are in the range of $0<x\leq0.2$ and $1.5\leq y\leq 2.0$, respectively, and comprises a C14-type crystal structure of Laves phase, the Laves phase having a segregaton phase of high Y concentration. Ti can be replaced by Hf and/or Zr within the range of over 0 to not greater than $(1-x)/2$ included in $1-x$ for the Ti atom. Mn can be replaced by V or Fe within the range of over 0 to not greater than $y/2$ included in y for the Mn atom. Mn is further replaceable by at least one element selected from the group consisting of Cr, Co, Ni, Cu and Al within the range of over 0 to not greater than $y/2$ included in y for the Mn atom, and can also be replaced by one of V and Fe at the same time when so required.

5 Claims, 4 Drawing Sheets

Ti

Mn

Y

HYDROGEN ABSORBING ALLOYS

This application is a continuation of application Ser. No. 08/539,221 filed Oct. 4, 1995, now abandoned.

FIELD OF INDUSTRIAL APPLICATION

The present invention relates to hydrogen absorbing alloys adapted to reversibly absorb and desorb hydrogen, and more particularly to improvements in hydrogen absorbing alloys for use in an environment where the alloy has the possibility of contacting oxygen as in hydrogen storage containers,

BACKGROUND OF THE INVENTION

Hydrogen absorbing alloys are positively used as hydrogen storage materials and materials for refrigeration systems. With this trend, alloys have been developed which have hydrogen absorption-desorption characteristics suited to individual uses. These alloys include Ti-Mn alloys, which have the advantage of a great capacity to absorb and desorb hydrogen per unit weight.

In the case where hydrogen absorbing alloys are used as packed in the hydrogen storage containers of fuel cells or in heat exchangers for refrigeration systems, air is likely to ingress into the container or the heat exchanger.

As an example, FIG. 7 shows a fuel cell 1 comprising a cell main body 4 and hydrogen storage containers 11 which are typically arranged, along with a control unit 20, etc., in a case 3 of aluminum or like light metal. The hydrogen storage container 11 is packed with a hydrogen absorbing alloy 12. The hydrogen within the container 11 is supplied to the cell main body 4 through a pipe 41. With this type of hydrogen storage container, air is likely to ingress into the container 11 when the hydrogen desorption pressure approaches atmospheric pressure. The container 11, which is removable, is also likely to permit air to flow into the container 11 when it is removed or installed.

Further when the alloy is used for refrigeration systems with the upper limit of the internal hydrogen pressure set at about 10 atm. during the operation of the system, the internal pressure is likely to drop below atmospheric pressure in the refrigeration heat generation process in view of the design, so that there is a possibility of air entering the container if the airtightness thereof becomes impaired.

It is further likely that the hydrogen gas to be supplied contains oxygen gas as an impurity.

Oxygen gas is highly adsorbable and is therefore adsorbed by or reacts with the hydrogen absorbing alloy when coming into contact therewith to make the alloy inactive. This is so-called poisoning, resulting in impaired hydrogen absorbing ability.

The impaired ability reduces the hydrogen storage capacity or system driving efficiency, so that it is indispensable to improve the resistance to poisoning for the actual use of the alloy.

The alloy having its hydrogen absorbing ability impaired by poisoning has a property to recover the ability to some extent when heated in a vacuum. Accordingly, the hydrogen absorbing alloy needs to have high ability for regeneration and recovery.

SUMMARY OF THE INVENTION

An object of the present invention is to improve the poisoning resistance and regeneration-recovery ability of Ti-Mn hydrogen absorbing alloys for use in an environment where the alloy has the possibility of contacting oxygen.

The hydrogen absorbing alloy of the present invention is a hydrogen absorbing alloy of the Ti-Mn type in which Ti is partly replaced by Y and which has a composition represented in atomic ratio by $Ti_{1-x}Y_xMn_y$ wherein x and y are in the range of $0 < x \leq 0.2$ and $1.5 \leq y \leq 2.0$, respectively, the alloy comprising a C14-type crystal structure of Laves phase, the Laves phase having a segregation phase of high Y concentration therein.

BRIEF DESCTIPTION OF THE DRAWINGS

DETAILED DESCRIPTION OF THE INVENTION

Figure 1:
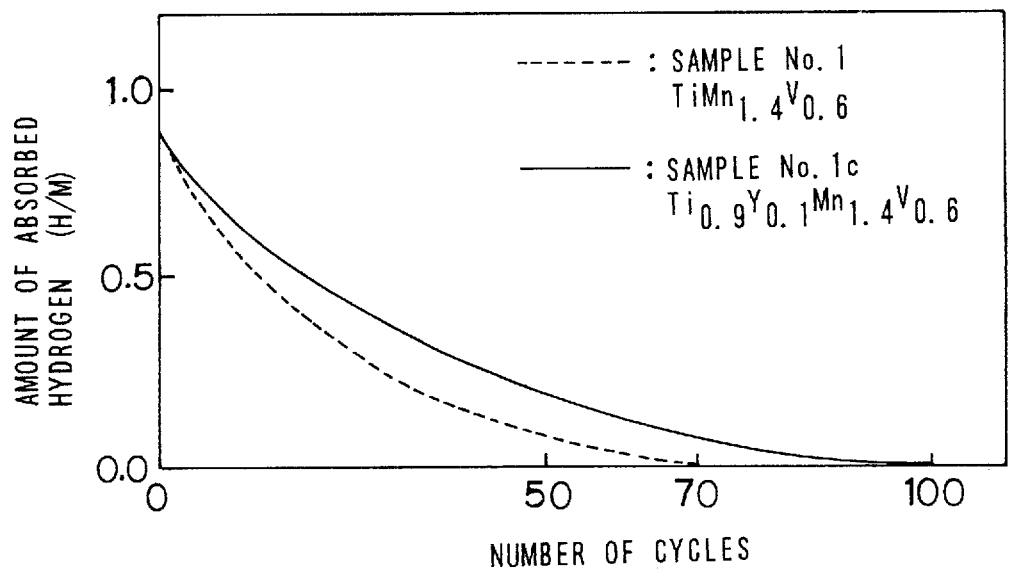
FIG. 1 is a graph showing variations in the amount of absorbed hydrogen during air-containing hydrogen absorption-desorption cycles.

As previously described, the hydrogen absorbing alloy of the present invention is represented in atomic ratio by $Ti_{1-x}Y_xMn_y$ wherein x and y are in the range of $0 < x \leq 0.2$ and $1.5 \leq y \leq 2.0$, respectively.

Represented by x is the amount of Ti replaced by Y (yttrium). Even if the amount is a very small measurable value, this element locally produces a segregation phase having a high Y concentration, improving the alloy in resistance to poisoning and regeneration-recovery ability. However, it is desired that the amount of replacement be at least 0.05. If the amount of Y is over 0.2, the segregation phase of high Y concentration occupies an increased proportion, decreasing the hydrogen absorbing capacity which is most substantial to the alloy. Accordingly, the upper limit for the amount of replacement should be 0.2, more preferably 0.15.

The value x is therefore preferably 0.05 to 0.15, most preferably about 0.1.

The value y is restricted to the range of at least 1.5 to not greater than 2.0 because the alloy phase is substantially a Laves phase and in order to obtain a metal of C14-type crystal structure. To obtain the C14-type crystal structure more reliably, y is more preferably at least 1.5 to not greater than 1.9.

According to the invention, Ti in the two-component alloy of Ti-Mn is partly replaced by Y to obtain a three-component alloy of Ti-Y-Mn so as to improve the poisoning resistance and regeneration-recovery ability of the alloy as already stated, whereas the hydrogen absorbing alloy of the invention is not limited to the three-component alloy; improved resistance to poisoning and higher regeneration-recovery ability are available with other multi-component alloys which are obtained by partly replacing Ti and/or Mn by various elements.

When required, Ti can be replaced by Hf and/or Zr within the range of greater than 0 to not greater than $(1-x)/2$ included in 1−x for the Ti atom because if the replacement is made within this range, the equilibrium hydrogen pressure is effectively controllable without influencing the effect to improve the poisoning resistance and regeneration-recovery ability. The upper limit for the amount of replacement is more preferably $(1-x)/5$.

When required, Mn can be replaced by V or Fe within the range of over 0 to not greater than y/2 included in y for the Mn atom for the following reason. The replacement by V or Fe is effective for controlling the equilibrium hydrogen pressure, and if the replacement is made in the above range, an alloy phase of Laves phase can be substantially formed.

When desired, Mn can be replaced by at least one element selected from the group consisting of Cr, Co, Ni, Cu and Al within the range of over 0 to not greater than y/2 included in y for the Mn atom. The presence of these elements is effective for improving the hysteresis and plateau characteristics of the alloy. and if the replacement is made in the above range, an alloy of Laves phase can be substantially formed. When Mn is replaced by these elements, Mn may be replaced also by either one of V and Fe at the same time when so required.

The hydrogen absorbing alloy of the invention has its Ti partly replaced by Y, so that a Y-rich segregation phase is formed in the alloy of Laves phase. Although the Y-rich segregation phase still remains to be fully clarified as to its behavior, this phase presumably has the following effect.

Since Y has very strong affinity for oxygen, oxygen preferentially combines with the Y-rich segregation phase when coming into contact with the hydrogen absorbing alloy. Objectionable oxygen is collected in the Y-rich phase, preventing oxygen from influencing the other phase portion to the greatest possible extent. Consequently, improved poisoning resistance is given to the alloy in its entirety.

Even if the Y-containing alloy of the invention has its hydrogen absorbing ability impaired by poisoning, the portion affected by oxygen is smaller than in Y-free alloys. The alloy therefore exhibits high ability to restore its hydrogen absorbing capacity when heated in a vacuum.

Figure 7:
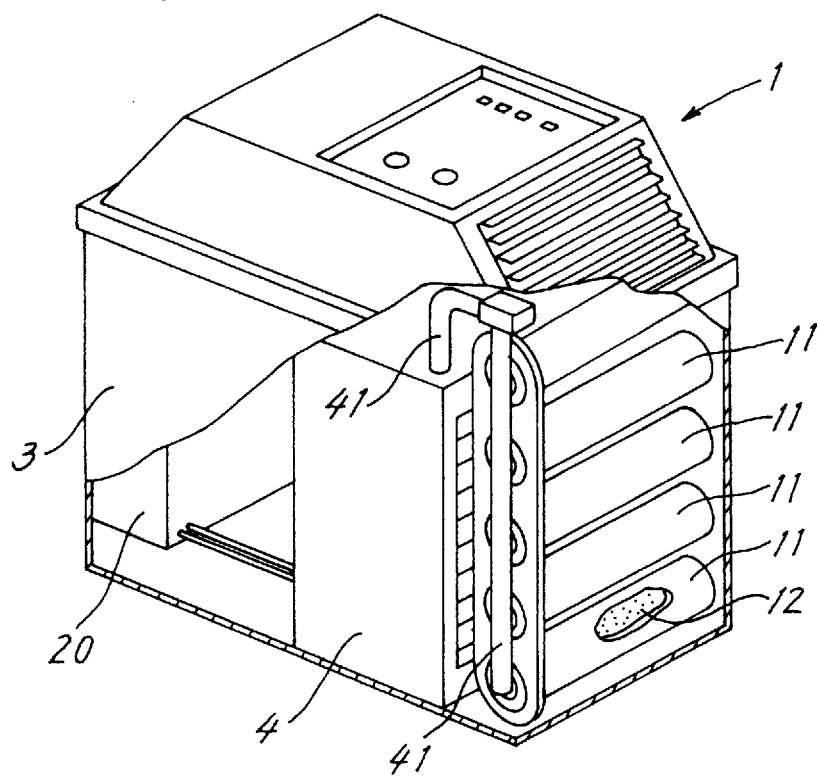
FIG. 7 is a perspective view partly broken away and showing a fuel cell including hydrogen storage containers.
Figure 8:
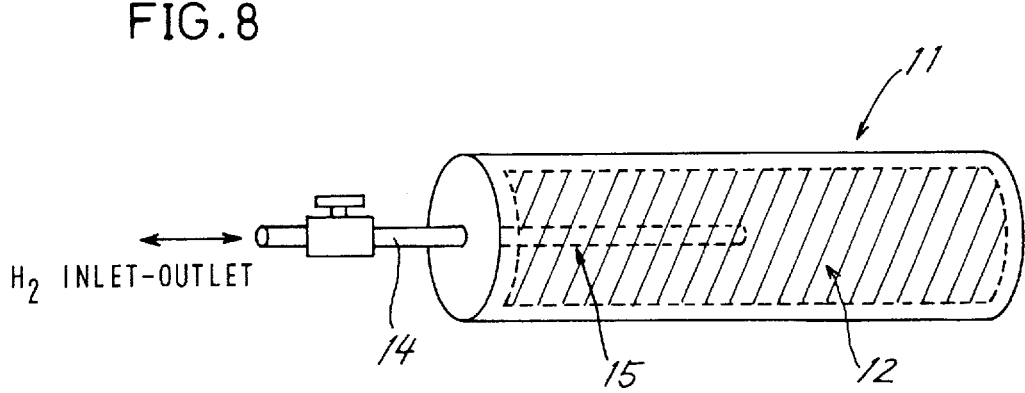
FIG. 8 is a diagram showing the hydrogen storage container in greater detail.

The hydrogen absorbing alloy of the present invention is used typically as packed in hydrogen storage containers for fuel cells, refrigeration systems, etc. FIG. 8 shows the hydrogen storage container 11 of FIG. 7 in greater detail. With reference to FIG. 8, the container 11 has connected to one end thereof a pipe 14 serving as an inlet and outlet for hydrogen gas, and is internally provided with a sintered filter 15 of stainless steel in communication with the pipe 14. The container 11 is prepared, for example, from aluminum or stainless steel and measures about 135 mm in length, about 40 mm in outside diameter and about 36 mm in inside diameter. The hydrogen absorbing alloy 12 is packed in the container for use. When having the above-mentioned size, the container 11 is packed with about 500 g of the alloy 12. The material and size of the container and the amount of the alloy of the invention to be filled into the container are given above merely as examples and are not limitative.

EXAMPLES

Preparation of Test Alloys

Specified quantities of the metals (99.9% in purity) of Ti, Mn, V, Y, Cr, Fe, Co, Ni, Cu and Al and specified quantities of the metals (98% in purity) of Zr and Hf were weighed out and used in desired combinations to prepare mixtures. Each of the mixtures was melted in an arc furnace having an Ar gas atmosphere to obtain a button-shaped ingot, which was then enclosed in a quartz tube and heat-treated at a temperature of 1050° C. for 8 hours.

Poisoning Resistance Test

The test alloy obtained was pulverized into a powder about 100 $\mu$m in particle size, and a 5.0 g quantity of the powder was placed into a stainless steel reactor.

For activation, the alloy was treated at 80° C. for 30 minutes while evacuating the reactor by a rotary pump, and thereafter subjected to a hydrogen pressure of 10 to 20 atm. at 0° C. and relieved of the gas repeatedly four times. The amount of absorbed hydrogen was measured at a temperature of 25° C. using a Sieverts' apparatus.

First, an initial amount of absorbed hydrogen was measured using pure hydrogen. Next using hydrogen containing 0.5 vol. % of air, the alloy was repeatedly subjected to 100 cycles of application of a hydrogen pressure of 15 atm. at 25° C. and removal of the gas, and checked for variations in the amount of hydrogen absorbed under pressure.

Method of Evaluating Poisoning Resistance

Assuming that the amount of absorbed hydrogen is X and the number of air-containing hydrogen absorption-desorption cycles is N, the test result indicated that the amount of absorbed hydrogen, X, exponentially decreases with an increase in the cycle number N as shown in FIG. 1 (which will be described later).

Accordingly, the amount of absorbed hydrogen, X (N), resulting from N cycles is expressed by the following equation.

$$X(N)=X(0)-(X(0)-X\infty) \exp(-kN)$$

wherein X∞ is a convergence value for X, and the value k was determined by means of least squares.

Since k corresponds to the rate of decrease in the amount of absorbed hydrogen, k was used as an index indicating the rate of deterioration of the hydrogen absorbing alloy. The greater the index value k for the rate of deterioration, the greater is the rate of reduction in the hydrogen absorbing ability with the repetition of the cycle and the higher is the rate of deterioration of the hydrogen absorbing alloy, hence lower resistance to poisoning.

Regeneration-Recovery Test

The alloy was subjected to a regeneration treatment by conducting evacuation at 180° C. for 5 hours using a rotary pump. The alloy was checked again for the amount of absorbed hydrogen with use of pure hydrogen.

The ratio of the amount of absorbed hydrogen after the regeneration treatment to the initial amount of adsorbed hydrogen was taken as a regeneration-recovery ratio. The greater the recovery ratio, the higher is the regeneration-recovery ability.

Tables 1 to 3 show the compositions of the test alloys, index values indicating the rate of deterioration of the alloys (listed merely as "index value") and regeneration-recovery ratios (listed as "recovery ratio").

With reference to the tables, samples No. 1 to No. 10 (without adscript a, b or c) are conventional Ti-Mn alloys. Samples No. 1a to No. 1c and No. 2a to No. 10a are Ti-Mn alloys of the invention containing Y substituting for a portion of Ti.

TABLE 1

| No. | Alloy | Index value x $10^2$ | Recovery ratio (%) | Example |
|---|---|---|---|---|
| 1 | $TiMn_{1.4}V_{0.6}$ | 5.0 | 12.3 | Comp. Ex. |
| 1a | $Ti_{0.98}Y_{0.02}Mn_{1.4}V_{0.6}$ | 4.9 | 16.7 | Invention |
| 1b | $Ti_{0.95}Y_{0.05}Mn_{1.4}V_{0.6}$ | 3.4 | 46.7 | Invention |
| 1c | $Ti_{0.9}Y_{0.1}Mn_{1.4}V_{0.6}$ | 3.6 | 55.5 | Invention |

TABLE 2

| No. | Alloy | Index value x $10^2$ | Recovery ratio (%) | Example |
|---|---|---|---|---|
| 2 | $TiMn_{1.4}Cr_{0.1}$ | 4.8 | 12.3 | Comp. Ex. |
| 2a | $Ti_{0.9}Y_{0.1}Mn_{1.4}Cr_{0.1}$ | 4.0 | 51.1 | Invention |
| 3 | $TiMn_{1.5}$ | 5.0 | 12.0 | Comp. Ex. |
| 3a | $Ti_{0.9}Y_{0.1}Cr_{1.5}$ | 4.2 | 50.4 | Invention |
| 4 | $TiMn_{1.4}Fe_{0.1}$ | 5.1 | 9.9 | Comp. Ex. |
| 4a | $Ti_{0.9}Y_{0.1}Mn_{1.4}Fe_{0.1}$ | 4.3 | 45.7 | Invention |
| 5 | $TiMn_{1.4}Co_{0.1}$ | 5.2 | 9.2 | Comp. Ex. |
| 5a | $Ti_{0.9}Y_{0.1}Mn_{1.4}Co_{0.1}$ | 4.2 | 44.1 | Invention |
| 6 | $TiMn_{1.4}Ni_{0.1}$ | 5.2 | 9.3 | Comp. Ex. |
| 6a | $Ti_{0.9}Y_{0.1}Mn_{1.4}Ni_{0.1}$ | 4.2 | 44.3 | Invention |
| 7 | $TiMn_{1.4}Cu_{0.1}$ | 5.4 | 7.6 | Comp. Ex. |
| 7a | $Ti_{0.9}Y_{0.1}Mn_{1.4}Cu_{0.1}$ | 4.2 | 40.1 | Invention |
| 8 | $TiMn_{1.4}Al_{0.1}$ | 4.2 | 14.4 | Comp. Ex. |
| 8a | $Ti_{0.9}Y_{0.1}Mn_{1.4}Al_{0.1}$ | 3.8 | 55.2 | Invention |
| 9 | $Ti_{0.9}Zr_{0.1}Mn_{1.5}$ | 4.8 | 13.0 | Comp. Ex. |
| 9a | $Ti_{0.8}Zr_{0.1}Y_{0.1}Mn_{1.5}$ | 4.4 | 51.9 | Invention |
| 10 | $Ti_{0.9}Hf_{0.1}Mn_{1.5}$ | 4.9 | 13.5 | Comp. Ex. |
| 10a | $Ti_{0.8}Hf_{0.1}Y_{0.1}Mn_{1.5}$ | 4.7 | 55.0 | Invention |

TABLE 3

| No. | Alloy | Index value x $10^2$ | Recovery ratio (%) | Example |
|---|---|---|---|---|
| 11 | $Ti_{0.9}Zr_{0.1}Mn_{1.7}V_{0.3}$ | 4.7 | 12.8 | Comp. Ex. |
| 11a | $Ti_{0.8}Zr_{0.1}Y_{0.1}Mn_{1.7}V_{0.3}$ | 3.9 | 51.2 | Invention |
| 12 | $TiMn_{1.6}V_{0.3}Al_{0.1}$ | 4.1 | 14.0 | Comp. Ex. |
| 12a | $Ti_{0.9}Y_{0.1}Mn_{1.6}V_{0.3}Al_{0.3}$ | 3.7 | 53.2 | Invention |

The alloys of samples No. 1 and No. 1c were checked for variations in the amount of absorbed hydrogen resulting from the air-containing hydrogen absorption-desorption cycles. FIG. 1 shows the result.

With reference to FIG. 1, it is seen that the amount of absorbed hydrogen exponentially decreases with an increase in the number of cycles. About 70 cycles reduce the amount of hyrogen absorbed by sample No. 1 which is a conventional alloy to zero, whereas the amount for sample No. 1c, an alloy of the invention, diminishes to zero after about 100 cycles. This indicates that the alloy of the invention is lower in the rate of decrease in the amount of absorbed hydrogen and has higher resistance to poisoning. The amount of absorbed hydrogen exponentially decreasing with the cycle number was expressed by the foregoing equation and the rate of decrease in the amount was determined using least squares. Tables 1 to 3 show the values of reduction rates obtained as index values indicating the rate of deterioration of the alloys.

With reference to Table 1, when the amount of Ti replaced by Y is 0.02, the improvements achieved in the rate of deterioration and in the recovery ratio are slight (compare samples No. 1 and No. 1a), whereas when the amount of replacing Y is 0.05 or 0.1, the rate of deterioration and the recovery ratio were improved remarkably (compare sample No. 1 with samples No. 1b and No. 1c).

Figure 2:
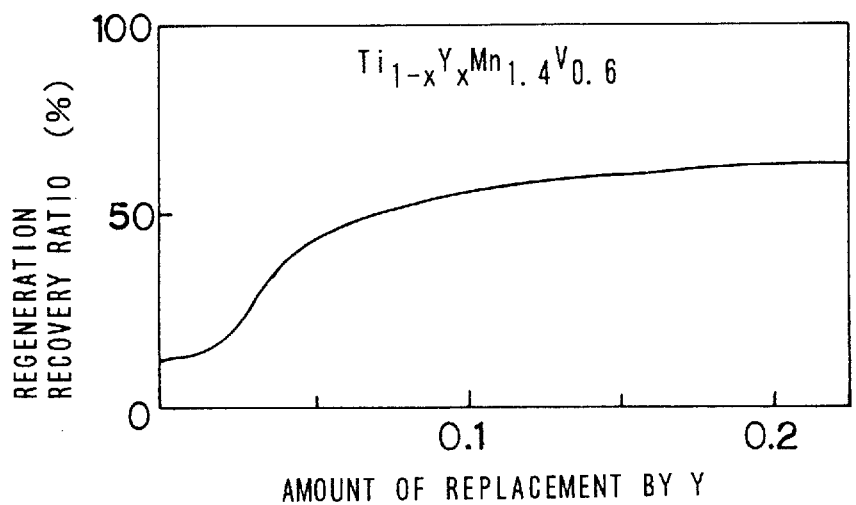
FIG. 2 is a graph showing the relationship between the amount x of replacement of Y and the regeneration-recovery ratio after deterioration by poisoning with air, as determined for $Ti_{1-x}Y_xMn_{1.4}V_{0.6}$ alloy.

FIG. 2 shows the relationship between the amount of replacement of Ti by Y and the regeneration-recovery ratio, as established on the basis of sample No. 1 as a master alloy. The graph reveals that although the recovery ratio was improved even by the presence of a very small amount of Y, the amount is preferably at least about 0.05 when a recovery ratio of at least 50% is to be ensured.

Tables 2 and 3 show the test results obtained as to the rate of deterioration and the regeneration-recovery ratio by replacing Ti by Y in an amount of 0.1 in various master alloys. These tables indicate that the alloys of the invention are lower in the rate of deterioration (higher in poisoning resistance) than the comparative alloys and are remarkably improved in the recovery ratio over the latter.

Figure 3:
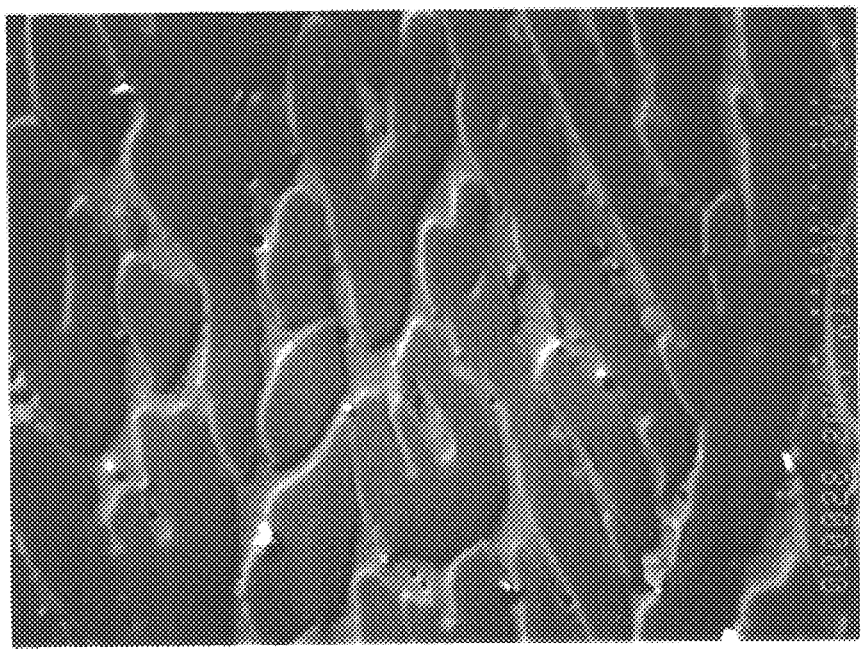
FIG. 3 is a photograph (X 1000) taken under an electron microscope and showing the microstructure of $Ti_{0.8}Y_{0.2}Mn_2$ alloy.
Figure 4:
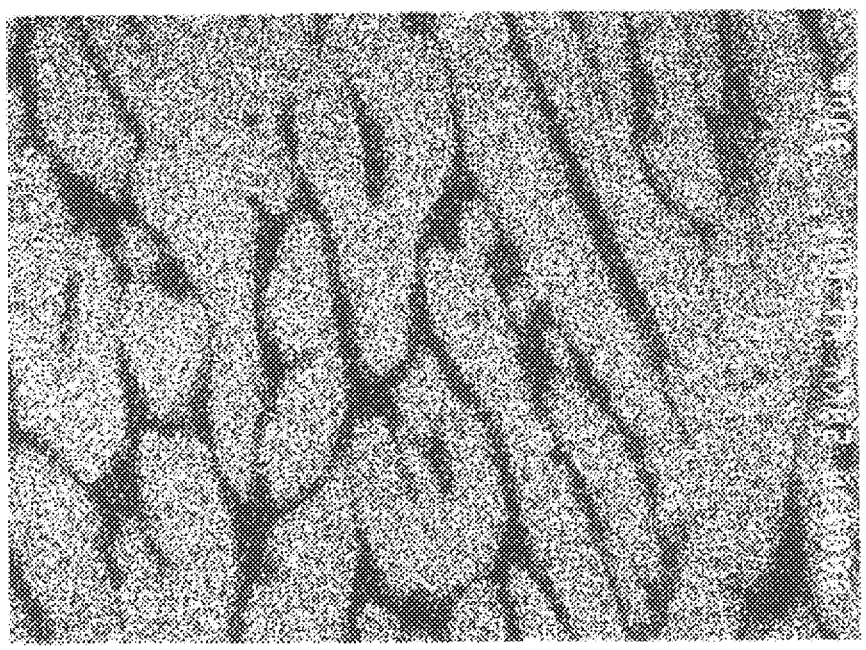
FIG. 4 is a photograph (X 1000) obtained by EPMA and showing the Ti component of the microstructure shown in FIG. 3.
Figure 5:
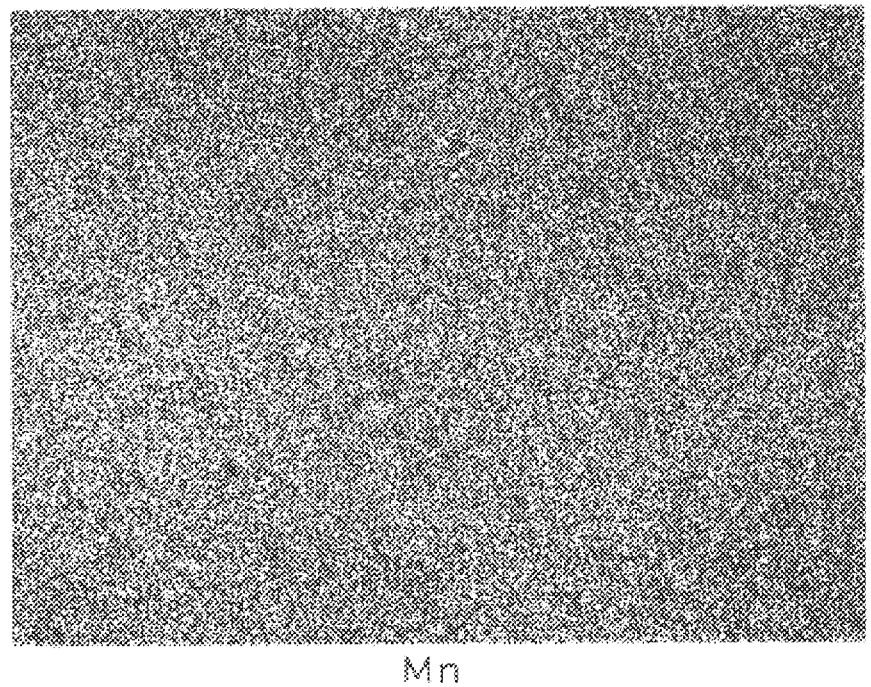
FIG. 5 is a photograph (X 1000) obtained by EPMA and showing the Mn component of the microstructure shown in FIG. 3.
Figure 6:
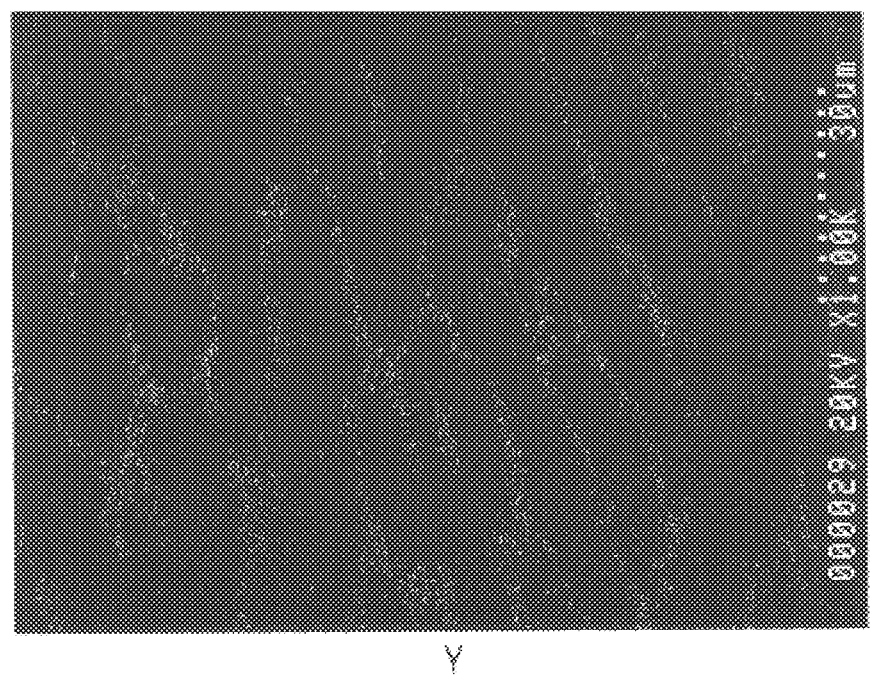
FIG. 6 is a photograph (X 1000) obtained by EPMA and showing the Y component of the microstructure shown in FIG. 3.

FIGS. 3 to 6 show the structure of $Ti_{0.8}Y_{0.2}Mn_2$ alloy. FIG. 3 shows a reflected electron image obtained by a scanning electron microscope (SEM), and FIGS. 4 to 6 show X-ray images of Ti, Mn and Y, respectively, obtained by electron probe microanalysis (EPMA). FIG. 3 shows a segregation phase of high Y concentration as white streaks. A phase of high Y concentration is seen as blackish areas in FIG. 4 and as whitish areas in FIG. 6.

It is thought that the presence of the Y-rich segregation phase is effective for improving the alloy in poisoning resistance and regeneration-recovery ratio.

The hydrogen absorbing alloys of the present invention are outstanding in resistance to poisoning and regeneration-recovery ratio and are therefore suited as hydrogen storage alloys for use in hydrogen storage containers and heat exchangers for refrigeration systems which are likely to permit ingress of air.

What is claimed is:

1. In a process of absorbing and desorbing hydrogen in a closed container having an inlet-outlet opening for hydrogen gas wherein a hydrogen absorbing alloy is packed in the container, the improvement wherein the hydrogen absorbing alloy contains therein an appropriate amount of Y, the alloy being represented in atomic ratio by $Ti_{1-x-z}\alpha_z Y_x Mn_{y-w}\beta_w$ wherein x, y, z and w are respectively in the range of $0.05 \leq x \leq 0.2$, $1.5 \leq y \leq 2.0$, $0 \leq z \leq (1-x)/2$ and $0 \leq w \leq y/2$, $\alpha$ is at least one of Hf and Zr, and $\beta$ is at least one element selected from the group consisting of V, Fe, Cr, Co, Ni, Cu and Al.

2. The process as defined in claim 1 wherein the alloy consists essentially of Ti, Y and Mn.

3. The process as defined in claim 1 wherein the alloy consists essentially of Ti, Y and Mn wherein Ti is partially replaced by at least one element selected from the group consisting of Hf and Zr.

4. The process as defined in claim 1 wherein the alloy consists essentially of Ti, Y and Mn wherein Mn is partially replaced by at least one element selected from the group consisting of V, Fe, Cr, Co, Ni, Cu and Al.

5. The process as defined in claim 1 wherein the alloy consists essentially of Ti, Y and Mn wherein Ti is partially replaced by at least one element selected from the group consisting of Hf and Zr, and wherein Mn is partially replaced by at least one element selected from the group consisting of V, Fe, Cr, Co, Ni, Cu and Al.

* * * * *